Feb. 9, 1954 R. J. SCHMIDT 2,668,794
DISTILLATION SYSTEM FOR RECOVERING SPENT PUMPING OILS
Filed May 24, 1946 2 Sheets-Sheet 1
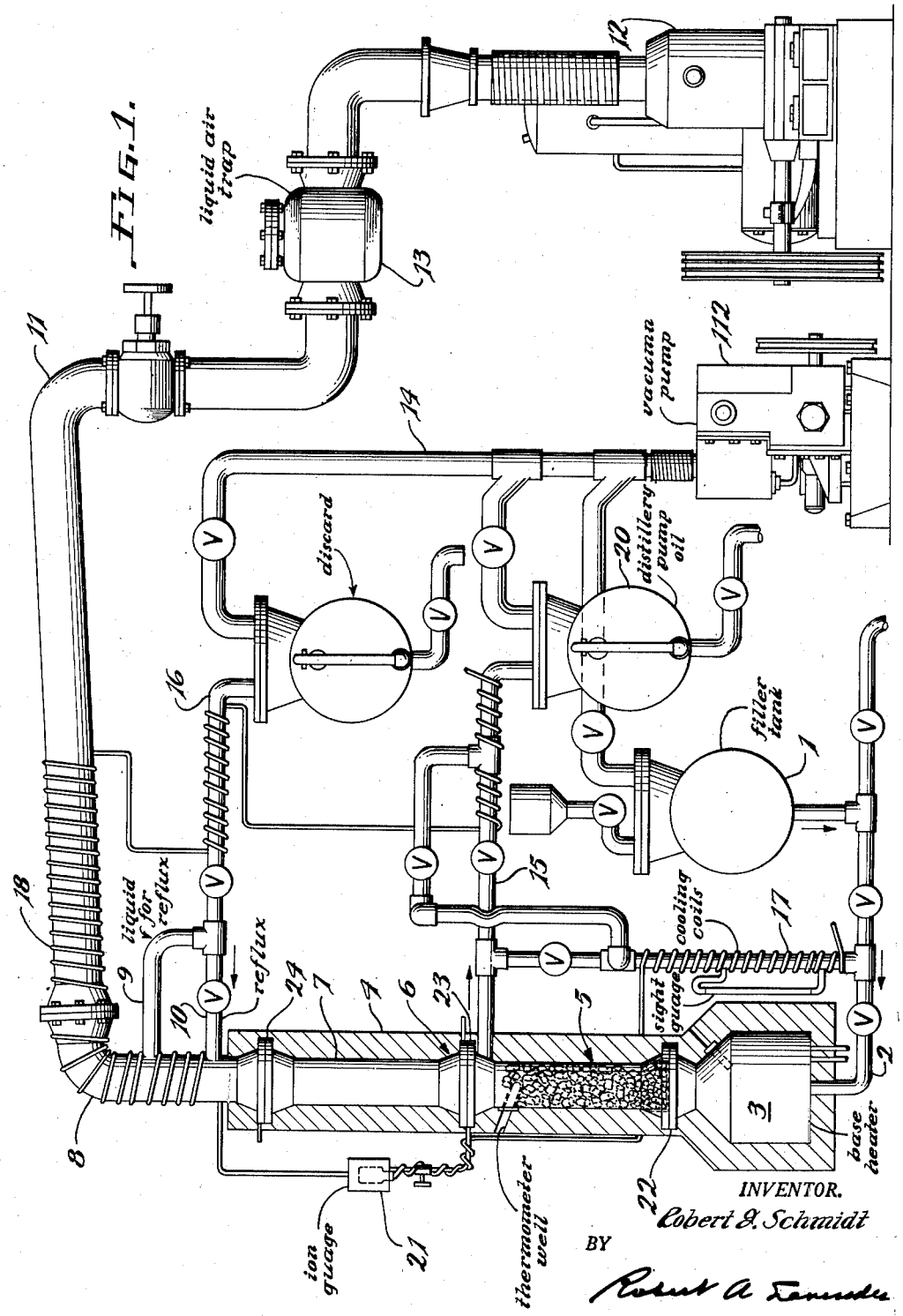
INVENTOR.
*Robert J. Schmidt*
BY Feb. 9, 1954 R. J. SCHMIDT 2,668,794
DISTILLATION SYSTEM FOR RECOVERING SPENT PUMPING OILS
Filed May 24, 1946 2 Sheets-Sheet 2
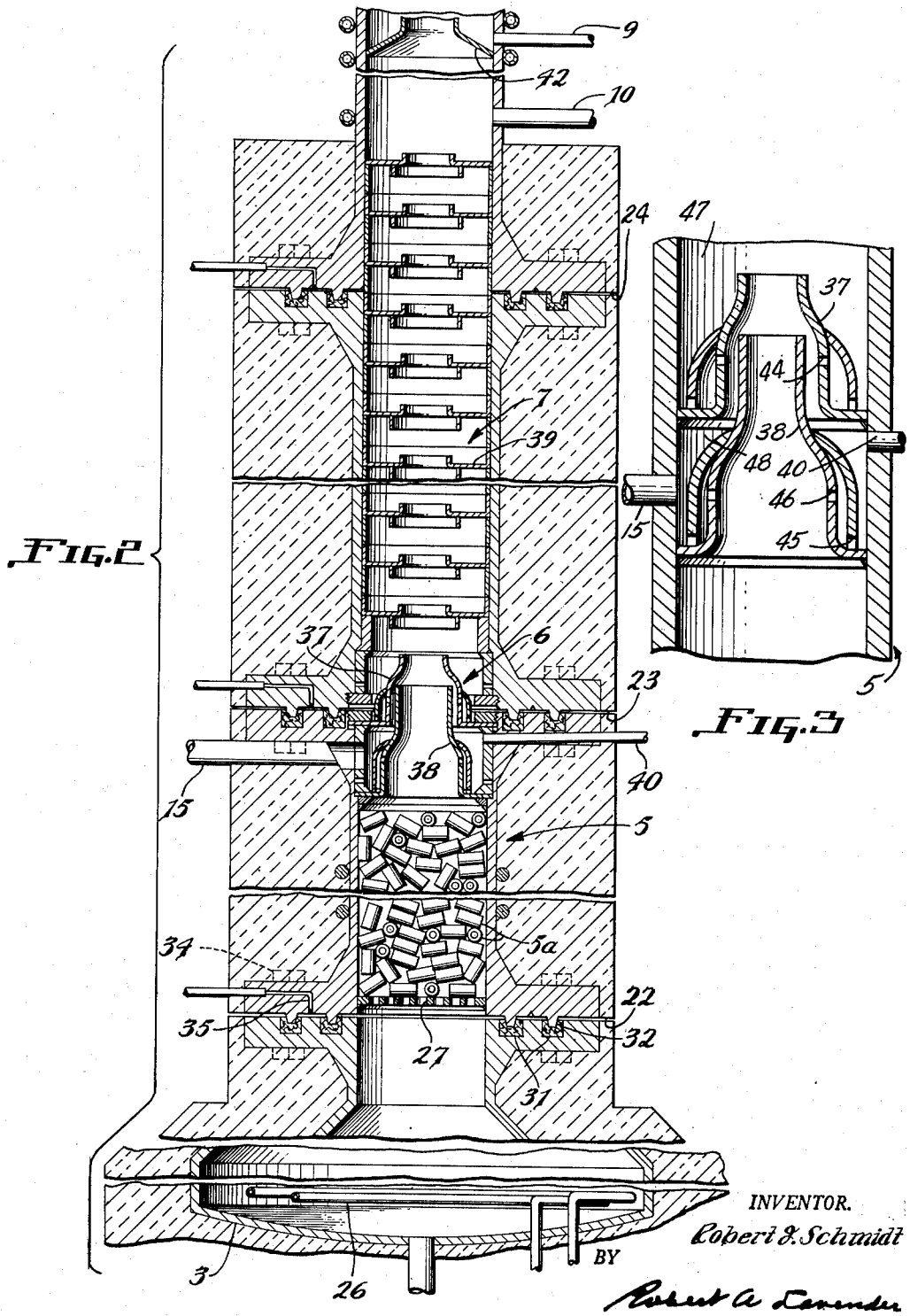
INVENTOR.
Robert J. Schmidt
BY
Robert A. Lavender Patented Feb. 9, 1954

2,668,794

UNITED STATES PATENT OFFICE 2,668,794

DISTILLATION SYSTEM FOR RECOVERING SPENT PUMPING OILS

Robert J. Schmidt, Oak Ridge, Tenn., assignor, by mesne assignments, to the United States of America as represented by the United States Atomic Energy Commission Application May 24, 1946, Serial No. 671,989

3 Claims. (Cl. 202—158)

This invention relates to an apparatus and process for the manufacture of high vacuum liquids and the salvage or recovery of pump liquids. More particularly this invention concerns the purification and recovery of, or similar treatment, of liquids, usually oils, and employed in diffusion pumps.

In many industrial operations carried out at the present time vacuum pumps are utilized to obtain extremely low pressures. These pumps utilize pumping fluids in their operation. Litton oil may be mentioned as an example of a pumping fluid frequently used in diffusion pumps although there are various phthalates or other organic liquids that are also used. After a period of use such liquids may become inefficient as pumping media due to contamination, the formation of decomposition products therein, and for various other reasons such as pollution of the oil by components from the system to which the pump is attached.

In such large industrial operations while it is, of course, possible to constantly replace used pumping oil with new fluids, in many instances the used pumping fluid is still valuable and I have found that a substantial and reutilizable portion thereof may be readily recovered, or that certain fractions thereof may be recovered which are still capable of utilization to obtain a predetermined pumping result. It is further apparent that in large industrial operations it is desirable to provide an apparatus and method which is more or less continuous in operation and operates to deliver a recovered liquid of a predetermined standard or capability for further use as a pumping medium.

I have found an apparatus and process which lends itself to industrial use whereby an arrangement is provided not only for the manufacture of pumping liquids or the processing of the used liquid undergoing recovery, but by measuring the degree of reduced pressure obtainable at a certain point in the apparatus and process there may be obtained an index of the degree of purification and an understanding of the quality of the liquid manufactured or recovered prior to the removing of the liquid from the distilling apparatus. In this way the characteristics as to further pumping capabilities of the pumping media are known.

This invention has for one object to provide an apparatus for the recovery of used pumping liquids.

Another object is to provide an apparatus for the distillation of primary oils in the manufacture of high vacuum oils.

Still another object is to provide an apparatus for reclaiming diffusion pump oils that have become inefficient due to contamination, formation of decomposition products therein and for other similar causes.

Still another object is to provide an apparatus of the class indicated whereby an index of the quality of the recovered liquid may be obtained during the recovery thereof.

Still another object is to provide distillation equipment particularly suitable for treating spent or used pumping oils.

A still further object is to provide an apparatus of the class indicated which may be made up of sections yet capable of assembly in a substantially gas-tight manner at high temperatures.

A still further object is to provide a process for the recovery of a reutilizable diffusion pump oil from used or spent oils wherein an oil is recovered of predetermined quality.

Other objects will appear hereinafter.

For a better understanding of my invention reference will be made to the attached drawings forming a part of the present application.

Fig. 1 is a side elevation view partly in section, somewhat in the nature of a flow sheet showing one complete apparatus assembly in accordance with the present invention.

Fig. 2 is a sectional view showing in detail the internal construction of the column portion of the apparatus of the present invention particularly with reference to the means for controlling the quality of manufactured or recovered product and the means for sealing the several column sections in a vacuum-tight manner.

Referring to Fig. 1, a feed tank 1 for containing the fluid to be processed is provided and connected by conduit 2 to the base heater 3 of a still 4.

This still may be made up of several sections such as section 5 containing Raschig rings. An intermediate constricted section is provided at 6 and a fractionating section at 7. This upper section 7 is connected with condensing section 8. A plurality of conduits 9 and 10 are provided for withdrawing condensate and returning reflux to the upper portion of the column.

The entire system is connected to vacuum pumps. That is, the upper portion of the column through the large conduit 11 is connected to vacuum pump 12. A suitable liquid air or nitrogen trap may be provided at 13 in accordance with conventional vacuum distillation practice.

The second vacuum pump 112 is interconnected with intermediate points on the column through conduits 14, 15 and 16.

Cooling coils are provided at 17 and 18 for example. These coils may be of conventional construction. Likewise a number of valves may be interposed in the various conduits at various points such as shown in the drawing.

Interposed intermediate of the column 4 is a vacuum gauge 21 for the special purpose to be described in detail hereinafter.

The joints between the various sections, namely at 22, 23 and 24 are of a special leakproof construction as will be described under Fig. 2.

Referring now to Fig. 2, the base heater 3 is provided with suitable heating coils 26 by means of which the fluid being distilled may be vaporized upwardly in the column. If desired, external heating means may also be used in place of these coils or in addition thereto.

Positioned above the base heater are the Raschig rings 5a supported on the grating 27. These rings serve to distribute the evolved vapors as they pass upwardly through the column. The base heater section 3 and the adjacent section 5 are held together by the vacuum-tight joint indicated at 22. This joint comprises the annular recessed portions 31 into which protrude the annular ring members 32. The recesses 31 are filled with a soft metal exemplified by aluminum, silver, copper, lead, or tin.

When the bolts 34 are tightened, this causes the protruding members 32 to be tightly embedded in the metal in recess 31 thereby forming a leakproof joint. However, as a further safeguard, a pump-out 35 is provided at an intermediate point. The various other joints 23 and 24 are constructed in a similar manner.

The intermediate section of the unit at 6 comprises a plurality of concentric members 37 and 38 and are similar in construction and function to corresponding parts found in a jet diffusion pump. This intermediate section is provided with a conduit 40 which leads to the ion gauge 21. The intermediate section is also connected to conduit 15 which leads to the product tank 20. As indicated, the construction of the intermediate section 6 including the concentric members 37 and 38 is similar to a diffusion pump in that the oil vapors pass upwardly through the constricted members 37 and 38, and function to create reduced pressure, not only aiding in the distillation under reduced pressure but the degree of which may be read on the ion gauge by means of its connection to section 6 through conduit 40.

The next section 7 of the column is filled with a plurality of fractionating plates 39 of substantially conventional construction.

Above these plates there are provided one or more collectors as 42 in the vicinity of reflux line 9, of standard construction, so that the condensed and fractionated portion of the distilled liquid may be collected therein and drawn off through conduit 9.

In the operation of the apparatus, the spent vacuum pump oil is placed in tank 1. The system is placed under reduced pressure by means of vacuum pumps 12 and 112. The oil flows through conduit 2 into the base heater 3 where it is volatilized, passing up through section 5, through section 6 and through the fractionating plates of section 7. The vaporized oil is fractionated in section 7. Some of the vapor fractions are condensed in parts 8 and 18 by means of the cooling applied thereto whereas undesired volatiles are carried out of the system. This condensate flows out through conduit 9, a portion thereof being returned to the column through conduit 10 as reflux and another portion being withdrawn through conduit 16 as the more volatile fractionated portion removed from the pumping oil.

A detailed sketch of intermediate section 6 of the fractionating column is shown in Fig. 3. After the system has been in operation for some time, the factionated oil from section 7 flows over the outside of member 37, through openings 43 and 44, thence over the outside of member 38 and through openings 45 and 46 and back into section 5.

The function of concentric members 37 and 38 is similar to that of a restrictor in a jet diffusion pump, namely to give the vapors a high velocity as they pass through said concentric members, resulting in a lower pressure in annular reservoirs 47 and 48. This higher vacuum in these reservoirs causes the condensed vapors therein to be further "degassed," i. e. the remaining constituents of higher volatility are vaporized in reservoirs 47 and 48, the gas molecules diffusing into the high velocity vapor stream provided by concentric members 37 and 38, and being carried upward by molecular bombardment until the remaining liquid in said reservoirs is of sufficiently low vapor pressure to be utilizable as a pumping medium. The reading of the vacuum gauge which is connected to conduit 40 serves as an index of the vapor pressure and degree of purification of the liquid in reservoir 48. When the vacuum gauge records a pressure of $2 \times 10^{-5}$, for example, or other value which may have been determined as a degree of reduced pressure which the pumping oils should be capable of producing, it is known that the pumping oil has been sufficiently processed, i. e. by means of the volatilization within the column, high boiling residues and components of low volatility have been separated from the oil so that the condensed oil in reservoir 48 is of a quality capable of producing a reduced pressure of a predetermined magnitude. This distilled and purified oil is then withdrawn through conduit 15.

The process may be operated continuously, that is, by suitable adjustment of the various valves shown, the oil to be processed may be substantially continuously fed into the base heater 3 and volatilized. The processed fraction may be continuously withdrawn through conduit 15, and the fractionated portion, which is more volatile, withdrawn through conduit 16.

It will be seen from the foregoing that I have provided a recovery device in which there is an interposed group of concentric pumping members which not only function to aid in producing reduced pressure under which the liquid being processed or recovered is treated, but which in addition furnishes an index of the degree of purification of the liquid being processed or recovered. By operating the apparatus and process until a predetermined degree of reduced pressure is indicated in the gauge, the pumping oil processed is thereby known in advance to be capable of utilization in a predetermined manner.

In large scale industrial operations where the oil to be processed may vary somewhat, the above-described arrangement provides a highly satisfactory method for substantially constantly and continuously manufacturing or recovering a product of uniform quality.

Various changes may be made in the setups such as omission of the Raschig rings from section 5, thus eliminating preliminary fractionating, or the substitution of a conventional bubble-cap column for the Raschig rings for preliminary fractionation in section 5.

My apparatus is not limited to two concentric pumping members 37 and 38, but may have a plurality of pumping members extending up the column resulting in the liquid being subjected to a progressively higher vacuum as it proceeds down the column.

I claim:

1. A distillation system for use in recovering spent pumping oils comprising a plurality of column sections including a base heater, a section containing vapor distributing means, an intermediate reduced pressure section comprising a plurality of spaced overlapped tubular orifice forming members providing oil collecting troughs, a fractionating section, and condensing and reflux sections, the entire system being connected with at least one vacuum pump, said system being characterized in that said intermediate reduced pressure section is provided with means for determining the degree of pressure prevailing therein and means for withdrawing the processed oil accumulating in this section.

2. An apparatus for use in recovering spent pumping oils from vacuum pumps comprising a plurality of column sections including means for vaporizing the spent oil, a section containing means for distributing oil vapors, an intermediate reduced pressure section having a plurality of spaced tubular elements with reduced extensions positioned in overlapping relation, a fractionating section and condensing and reflux sections, the entire system being connected with at least one vacuum pump, said apparatus being characterized in that the intermediate reduced pressure section is provided with means for determining the degree of pressure prevailing therein and means for withdrawing processed oil accumulating in this section.

3. A distillation system for use in the manufacture of high vacuum pumping oils comprising a plurality of column sections including a base heater, a section containing vapor distributing means, an intermediate reduced pressure section comprising a plurality of axially spaced concentric tubular members each having a reduced extension on one end which is overlapped by the next adjacent one of said tubular members, fractionating sections and condensing reflux sections, the entire system being connected with at least one vacuum pump, said system being characterized in that the intermediate reduced pressure section is provided with means for determining the degree of pressure prevailing therein and means for withdrawing the processed oil accumulating in this section.

ROBERT J. SCHMIDT.

References Cited in the file of this patent

UNITED STATES PATENTS

| Number | Name | Date |
|---|---|---|
| 174,035 | Vick | Feb. 22, 1876 |
| 1,715,854 | McKensie-Martyn | June 4, 1927 |
| 1,831,887 | Sicck | Nov. 17, 1931 |
| 1,937,782 | Pew | Dec. 5, 1933 |
| 2,064,703 | Van de Graaf | Dec. 15, 1936 |
| 2,311,180 | Bogart | Feb. 16, 1943 |
| 2,324,088 | Jewett | July 13, 1943 |
| 2,415,411 | Bowman | Feb. 11, 1947 |

FOREIGN PATENTS

| Number | Country | Date |
|---|---|---|
| 160,239 | Switzerland | May 1, 1933 |